March 5, 1940.　　C. W. LARNER　　2,192,499
VALVE
Filed Oct. 1, 1938　　3 Sheets-Sheet 1

INVENTOR
Chester W. Larner

Patented Mar. 5, 1940

2,192,499

UNITED STATES PATENT OFFICE 2,192,499

VALVE

Chester W. Larner, Philadelphia, Pa.

Application October 1, 1938, Serial No. 232,774

9 Claims. (Cl. 137—139)

This invention relates to valves of the plunger or needle type for use in conduits or pipe lines to interrupt or regulate the flow of fluids therein.

In the case of valves of the type illustrated in my Patent 1,465,916, granted August 21, 1923, it has been found that when used with elastic fluids, such as steam, air or other gases, trouble is experienced due to axial oscillation of the plunger and consequent hammering of the plunger against its seat or against the pilot valve. This is not likely to happen when used with a liquid because the plunger cannot move without causing flow through the pilot valve. But with elastic fluids, the plunger can move without such flow taking place, due to changes of volume of the fluid contained behind the plunger, these changes resulting from fluctuations of pressure in various regions of the valve structure. It has been found impractical to control the plunger movement entirely by balancing or unbalancing the fluid pressures acting upon it. These pressures may be balanced in order to reduce the load on the operating gear but means should be provided to lock the plunger and the operating gear positively together so that the motion of the plunger is directly effected by mechanical force applied by means of the operating gear.

One object of this invention is to provide a plunger valve having the aforesaid characteristics in which the plunger and pilot valve are locked together by exhausting pressure from an internal chamber of the valve, thus avoiding the complications of mechanical locking means.

Another object is to provide a valve of the plunger type particularly suitable for use with high pressures and high temperatures, due to the fact that none of the sliding contacts between the component parts are under heavy pressures as in the case of disc or gate valves, for example.

Another object is to provide a plunger valve for high temperatures, the internal parts of which may be water or air cooled.

Other objects will appear from the following description.

In the drawings, Fig. 1 is a longitudinal cross-section through a valve showing one form of my invention.

Figure 1:
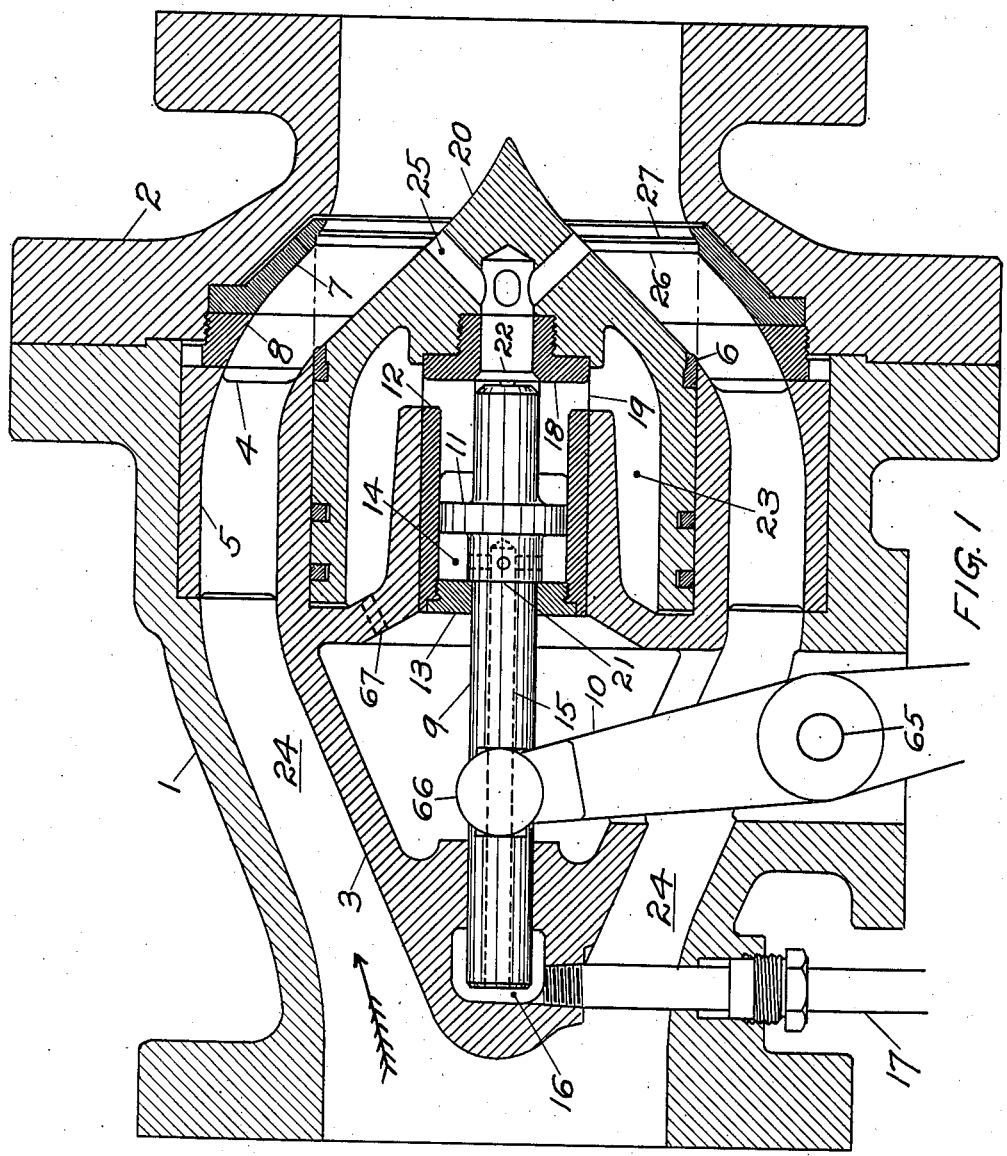

In the valve shown in Fig. 1 the body is made in two parts, an entrance section 1 and a discharge section 2. The internal cylinder 3 is connected by radial ribs 4 to a ring 5 which sets into a recess in the body section 1. This construction simplifies the casting of the body and internal cylinder and has another important advantage in that it makes it possible to use different metals for the body and internal cylinder. The body is subjected to high internal pressure and must have ample tensile strength whereas the maximum stress in the internal cylinder is compressive due to external pressure and therefore the tensile strength of the material is not important. It is important, however, to use a material suitable to preserve a smooth surface for the sliding fit with the plunger at extremely high temperatures.

The plunger 20 is provided with a seat ring 6 which closes against a seat ring 7 inserted in the body 2. This ring has a slight clearance with the body, giving the ring a little flexibility which is of advantage in securing a tight closure of the valve. The seat ring 7 is secured in position by a lock ring 8. Plunger 7 is the same diameter as its seat as a result of which the areas of the plunger exposed to pressure on the upstream and downstream sides are substantially the same and if the average unit pressures are balanced the plunger will have substantially no tendency to move in either direction as a result of these pressures.

The pilot valve 9 is shifted to and fro axially by the lever 10 pivoted at 65 and having a forked end 66 which straddles the pilot valve and fits into two flattened spots so that the circular end of lever 10 works against the shoulders on the pilot valve as shown. Lever 10 is moved by an external operating gear omitted from Fig. 1 but shown in Fig. 3, and described in connection therewith.

Pilot valve 9 has a collar 11 which works as a piston in the cylinder 12, which is provided with a head 13, thus forming an enclosed chamber. This chamber, while the valve is being operated, is vented to a region of low or atmospheric pressure through the passage 15, discharging into the chamber 16, which is exhausted to a drain or some suitable region of low pressure, through the pipe 17. Pipe 17 is provided with a stop cock or valve which is opened only when the main valve is being opened or closed. At all other times the discharge through pipe 17 is cut off so there is no objectionable leakage.

Cylinder 12 is connected to the pilot valve seat ring 18 by means of ribs 19 so that cylinder 12 moves with plunger 20. It will thus be seen that the full fluid pressure which is exerted against cylinder head 13 whenever the valve is in use tends at all times to force cylinder head 13 against the shoulder 21 on the pilot valve, this being due to the fact that pressure is reduced in chamber 14 whenever plunger 20 is being operated.

The pressures against the upstream and downstream faces of the plunger 20 are substantially equalized when pilot valve 9 is withdrawn from its seat 22, the leakage coming into chamber 23 from the flow space 24 being discharged through the holes 25 in the downstream face of the plunger. The area of the discharge passages 25 is greatly in excess of the clearance space between the plunger and the internal cylinder through which the incoming fluid must pass. The plunger may be equipped with packing rings as shown in order to more readily control the quantity of leakage but these rings must be loose enough to permit sufficient leakage to operate the plunger or else a port or ports 67, shown in broken lines, must be provided for this purpose.

The seat ring 7 has a short cylindrical bore 26 which the plunger enters before seating on the ground seat 27. This cuts off most of the flow before the ground surfaces touch and maintains them in better condition. It also serves in priming the downstream pipe line as will be described later.

*To close the valve*

Discharge pipe 17 is opened, dropping the pressure in chamber 14. Pilot valve 9 is moved in the downstream direction, by means of the external operating gear, the plunger moving with the pilot valve and maintaining the relation shown in Fig. 1, due to the fact that the pressure has been discharged from chamber 14.

The plunger will move with the pilot valve, the two being held together in mechanical contact, by unbalancing the fluid pressures as aforesaid. This relation will continue until plunger 20 seats. Further movement of the pilot valve will then cause it to seat at 22, thus cutting off leakage from chamber 23. Discharge through pipe 17 is then closed off and the plunger 20 is held against its seat by the full pressure of the fluid entering chamber 23 through the clearance space around the plunger.

*To open the valve*

Discharge pipe 17 is opened, dropping pressure in chamber 14. Pilot valve 9 is then moved a short distance in the upstream direction until shoulder 21 engages cylinder head 13. This permits all of the fluid leaking into chamber 23 to pass out through the ports 25 and prime the downstream pipe line. This will equalize the pressures on the upstream and downstream faces of the plunger but nevertheless the plunger will be held against its seat by a substantial positive pressure exerted against the cylinder head 13 and effective because of the low pressure in chamber 14.

If the fluid discharged by the pilot valve through openings 25 is not sufficient for priming purposes, a slight further movement of pilot valve 9 will unseat the plunger but still leave it within the bore 26. This will admit more fluid into the downstream pipe. When the downstream pipe is primed and brought up to full pressure the movement of valve 9 upstream is continued until the plunger has completed its stroke. The discharge through pipe 17 is then closed.

If the main valve is operated by hand, there is no objection to a hand-operated valve in pipe 17 and this is the simplest arrangement. If, however, the main valve is operated by a motor under remote control, the discharge through pipe 17 should preferably be cut off automatically. Means for doing this is described in connection with Fig. 3.

Figure 2:
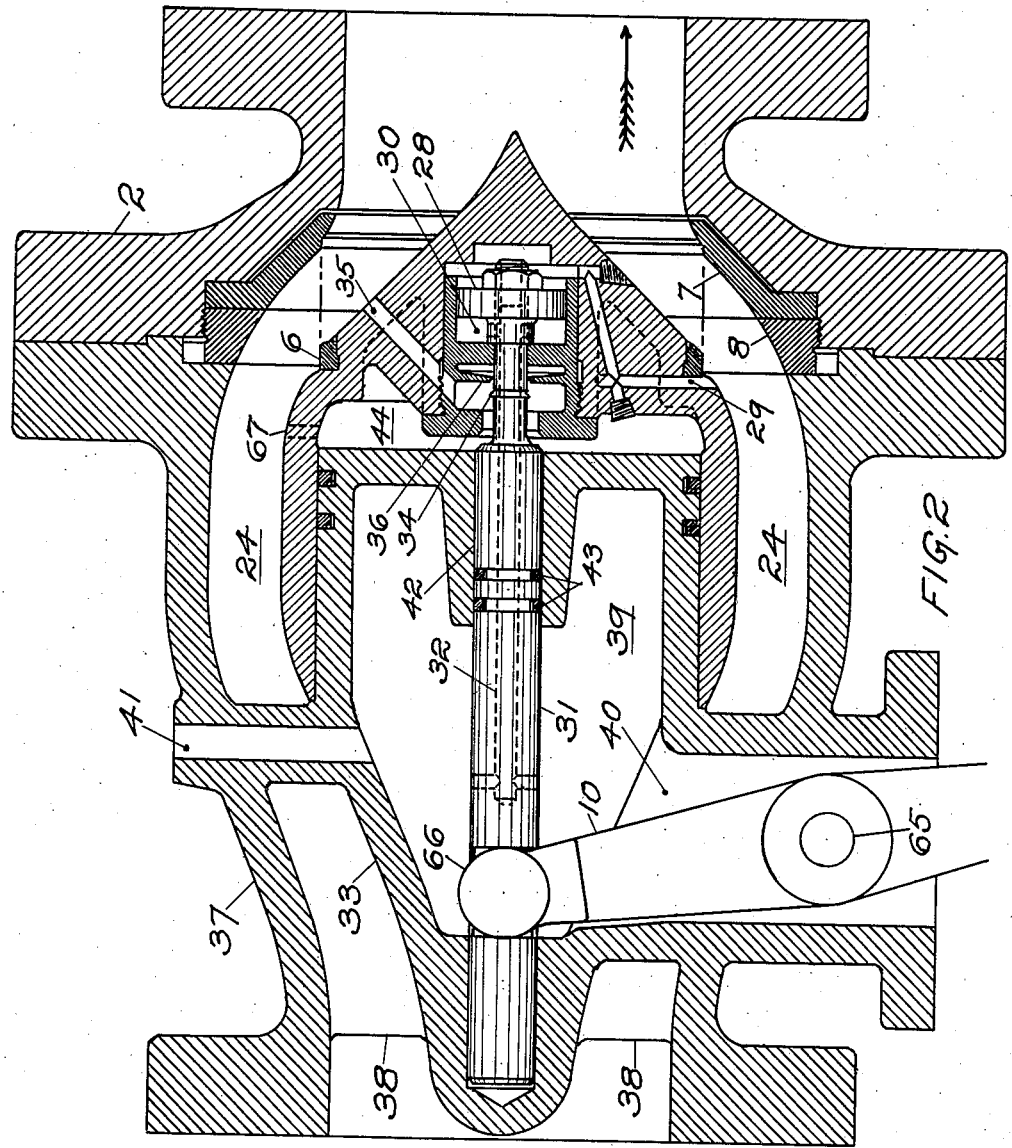
Fig. 2 is a view similar to Fig. 1, showing a modified construction.

Fig. 2 shows an alternative arrangement of the pilot valve which may be substituted for the arrangement shown in Fig. 1. In Fig. 2 the pressure against the downstream face of piston 28 is supplied by a set of drilled holes 29 connecting with the passageway 24 at a point upstream of the plunger seat. This insures a supply of pressure at all times when the valve is in use.

Pressure is exhausted from the upstream face of piston 28 by connecting chamber 30 to a region of low atmospheric pressure through a drilled hole 32 in the pilot valve 31. This arrangement is designed for use when the internal cylinder 33 is water or air-cooled. Circulating water, for example, would pass through this chamber at a relatively low pressure and it is practicable to discharge chamber 30 into the circulating water as shown. If, however, the valve is not water-cooled, passage 32 is drilled through to the upstream end of pilot valve 31 and an exhaust pipe is provided such as 17 shown in Fig. 1.

An auxiliary valve 34 is provided for the purposes of stopping leakage past piston 28 and through ports 35 when both the main plunger and the pilot valve are closed. This construction is, in effect, a double seated valve which is generally troublesome to keep tight and in order to obviate this difficulty the valve seat 36 is made thin and flexible so that the fluid pressure against it will hold it tightly against valve 34, and it is free to deflect slightly in both directions.

Fig. 2 shows the arrangement of the pilot valve just described in combination with a plunger having an outside fit on the internal cylinder. This, however, is not essential to the operation of the pilot valve as shown. It can be combined with a plunger having an inside fit as shown in Fig. 1.

In Fig. 2 the internal cylinder 33 is cast integral with the body section 37, being connected thereto by radial ribs 38. The chamber 39 inside of the internal cylinder is not open to the passageway 24 as in the case of Fig. 1. The arrangement of Fig. 2 is designed to permit a supply of cooling water or air to enter through the passage 40 and discharge through the passage 41.

No fluid can escape from chamber 39 into other parts of the valve or into the pipe line except through the clearance space 42 around the pilot valve and through the drilled hole 32. However, under all practical operating conditions there would be fluid pressure at the downstream end of these two passages which would tend to produce a flow into chamber 39 rather than to permit a flow out of it. If the plunger were ever opened into an empty line, there would be a short period while the plunger was being unseated when there might be a tendency for fluid to flow out of chamber 39. This condition would obtain to a certain extent while the line is being primed but would apply only to the clearance space 42 which is packed with the rings 43. It would be only a very short time before the pressure in chamber 44 would be greater than the pressure in chamber 39 so the tendency to leakage would be in the other direction.

The type of plunger shown in Fig. 2 is best adapted to air or water-cooling because if, for example, it is applied to a steam valve the plunger will get much hotter than the internal cylinder. It will expand more and the clearance between the two will increase with the temperature so that there will be no danger of the plunger sticking due to the unequal temperatures of these two parts.

Figure 3:
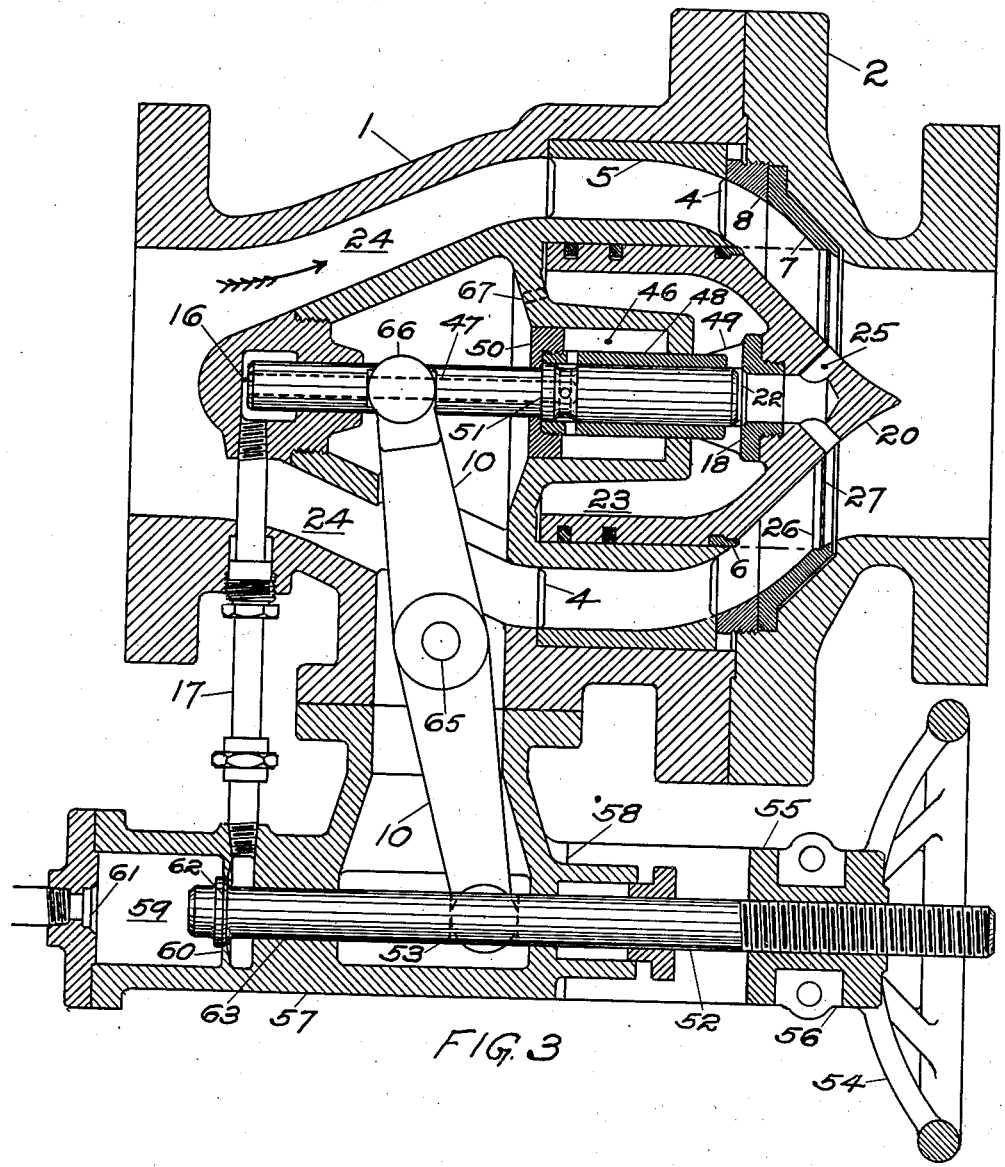
Fig. 3 is a view similar to Figs. 1 and 2, showing another modification and including the external operating gear, which is omitted from Figs. 1 and 2.

Fig. 3 shows the external operating gear for shifting the pilot valve, which is applicable also to Figs. 1 and 2. The pilot valve arrangement of Fig. 3 is almost the same as that of Fig. 1, the only difference being in the arrangement of the low-pressure chamber 46, which corresponds functionally to chamber 14 of Fig. 1, and is exhausted through passage 47 which corresponds to passage 15 of Fig. 1.

In Fig. 3, a sleeve 48 is connected to the valve seat 22 by ribs 49 and therefore the sleeve moves with plunger 20. Collar 50 is screwed on the end of sleeve 48 and this collar is subjected at all times to full pressure against its upstream surface. Therefore, since pressure is exhausted from chamber 46 whenever the plunger is in operation, it is clear that collar 50 will be held in contact with shoulder 51 on the pilot valve and that the pilot valve will be fully opened, thus balancing pressures on the upstream and downstream faces of plunger 20 at all times when the plunger is off its seat.

This is the fundamental operating principle of all the arrangements shown, namely, that whenever the plunger is off its seat it is effectively locked to the pilot valve and moved mechanically by the operating gear.

The operating gear consists of a rod 52 with a slot 53 cut though it into which the flattened end of lever 10 fits. In this way axial movement of rod 52 produces corresponding axial movement of the pilot valve. Rod 52 is threaded at one end and provided with a hand-wheel 54 having a threaded hub 55 which is held against axial movement by a thrust yoke 56 made in halves and bolted to the housing 57 at the joint 58. With this arrangement it is obvious that turning hand-wheel 54 will produce axial movement of rod 52.

As previously explained, the exhaust pipe 17 may be controlled by a hand-operated valve, if desired. Fig. 3, however, shows an arrangement for automatically opening and closing pipe 17 by the movement of rod 52 and this arrangement is of advantage in connection with remote controlled valves. The exhaust from pipe 17 passes through a chamber 59 which is provided with two valve seats 60 and 61. In the position of rod 52 shown, the collar 62 is in contact with seat 60, thus cutting off the exhaust from pipe 17 and the leakage through fit 63. Valve seat 60 is made slightly flexible in order to fit tightly against collar 62 and take up any slight discrepancy due to inaccurate positioning.

At the other end of the stroke of rod 52, the end of the rod closes against seat 61, which likewise cuts off the exhaust from pipe 17 and the leakage at 63. It will be noted that at this end of the stroke the plunger 20 and the pilot valve are also seated. The difficulty of seating the pilot valve and rod 52 simultaneously is overcome in this case by the fact that the pilot valve is held against its seat by unbalanced fluid pressure and it is not necessary to force it against its seat by means of the operating gear. Any slight discrepancy in the seating of these two valves will be taken up in the spring or lost motion in the operating gear.

I claim:

1. In a valve, the combination of a body supporting an internal cylinder, a plunger having telescopic relation to said cylinder and seating against said body to control the flow of fluid through the valve, a pilot valve to balance the pressures upstream and downstream of the plunger, operating gear for moving the pilot valve, and fluid pressure means to hold the plunger and pilot valve together in fixed relation so that the movement of the plunger is effected mechanically by said operating gear.

2. In a valve, the combination of a body supporting an internal cylinder, a plunger having telescopic relation to said cylinder and seating against said body to control the flow of fluid through the valve, a pilot valve to balance the pressures upstream and downstream of the plunger, operating gear for moving the pilot valve, a pressure chamber cooperating with the pilot valve and plunger, and means for exhausting pressure from said chamber thereby tending to hold the plunger and pilot valve together in fixed relation so that the movement of the plunger is effected mechanically by said operating gear.

3. Claim 2 further characterized in that the said operating gear is provided with means to cut off the exhaust from said pressure chamber in the extreme positions of the operating gear.

4. Claim 1 further characterized in that means is provided to circulate a cooling fluid through the internal cylinder.

5. Claim 2 further characterized in that means is provided to circulate a cooling fluid through the internal cylinder.

6. Claim 1 further characterized in that one element of said operating gear is a pivoted lever which engages said pilot valve and moves said pilot valve axially of said valve.

7. Claim 2 further characterized in that one element of said operating gear is a pivoted lever which engages said pilot valve and moves said pilot valve axially of said valve.

8. Claim 1 further characterized in that said fluid pressure means includes a fluid passage through said pilot valve.

9. Claim 2 further characterized in that said pilot valve contains a passage for exhausting fluid pressure from said pressure chamber.

CHESTER W. LARNER.